Feb. 14, 1950        P. F. RICE        2,497,559

MULTIPLE EXPOSURE CAMERA

Filed Feb. 4, 1947        2 Sheets-Sheet 1

Percy F. Rice
INVENTOR.

BY
Francis D. Ammen
ATTORNEY

Feb. 14, 1950 P. F. RICE 2,497,559
MULTIPLE EXPOSURE CAMERA
Filed Feb. 4, 1947 2 Sheets-Sheet 2
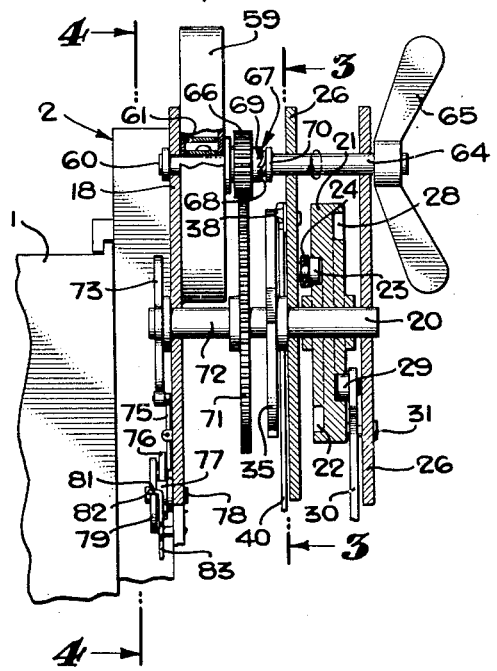
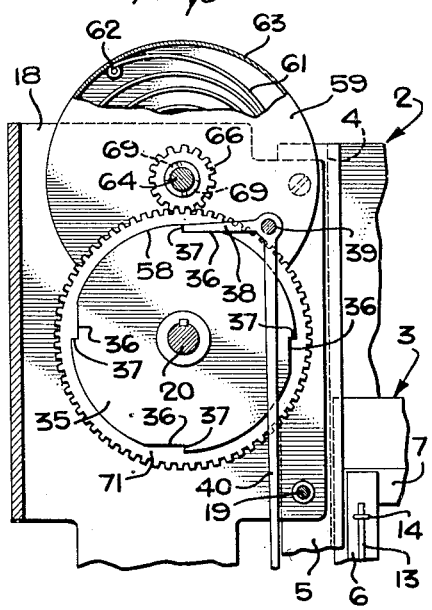
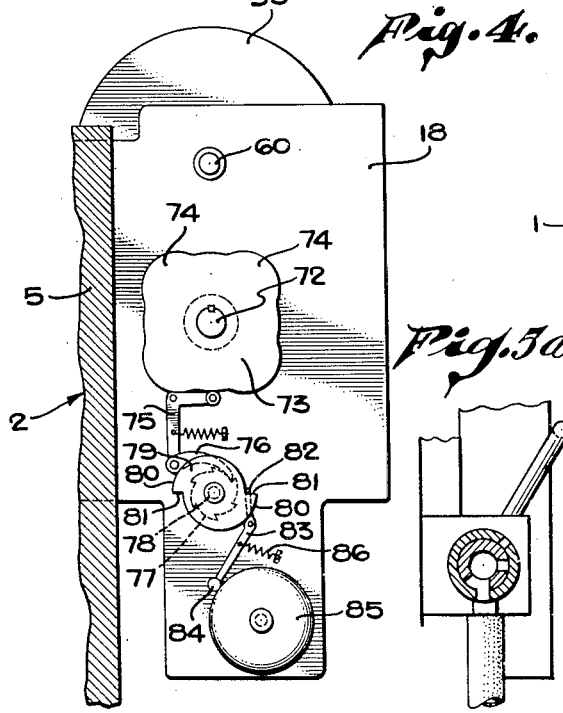
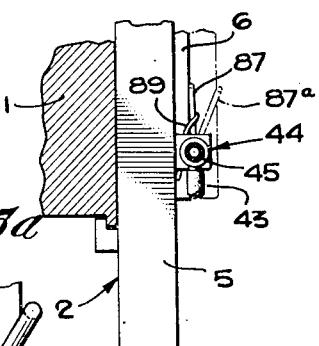
Percy F. Rice
INVENTOR.
BY Francis D. Ammen
his ATTORNEY

UNITED STATES PATENT OFFICE 2,497,559

MULTIPLE EXPOSURE CAMERA

Percy F. Rice, Santa Ana, Calif., assignor of one-half to William H. Donahue, Santa Ana, Calif.

Application February 4, 1947, Serial No. 726,409

3 Claims. (Cl. 95—37)

1

This invention relates to cameras, and while features of the invention may be employed in cameras used for any purpose whatever, improvements about to be described, are particularly useful when embodied in a camera for taking portraits. Cameras used in portrait work, are sometimes constructed so that the light-sensitive means such as the photographic plate, or film, is shifted after each exposure. In this way a succession of areas or "frames" may be brought into alignment with the lens, and a succession of pictures registered on the different areas. In portrait work, the subject of course would be placed in a different pose for each exposure. One of the objects of the invention is to provide a simple construction for effecting this mode of operation.

Another object of the invention is to provide features of construction that will enable the necessary shifting of the light-sensitive means to be effected automatically immediately after an exposure of one of the areas or "frames" on the light-sensitive means has occurred.

In the preferred embodiment of the invention, it includes motivating means for effecting the shifting movements of the carriage on which the light-sensitive means is mounted when making the exposures; and one of the objects of the invention is to provide means for normally holding the motivating means in check, together with automatic means for effecting its release, brought into action automatically after each exposure has been made. And in a camera having the usual pneumatic bulb, one of my objects is to provide means controlled by the release of the pneumatic bulb to effect the releasing of the detent means for the motivating means, or motor.

Another object of the invention is to provide means for inhibiting the operation of the shifting mechanism when there is no light-sensitive means in place on the camera.

Another object of the invention is to provide means for indicating to the photographer when the cycle of exposures has been completed, thereby avoiding any possibility of making more than one exposure on one area or "frame."

Further objects of the invention will appear hereinafter.

The invention consists in the novel parts and combinations of parts to be described hereinafter, all of which contribute to produce an efficient multiple exposure camera.

A preferred embodiment of the invention is described in the following specification, while

2 the broad scope of the invention is pointed out in the appended claims.

In the drawing:

Fig. 1 is a rear elevation of the camera back, illustrating means that I prefer to employ in adapting my improvement to a camera back in order to enable a series of exposures to be made automatically; that is to say, to effect the automatic shifting of the light-sensitive means after each exposure. In this view a portion of the casing of the mechanism is shown in section to further illustrate details of the shifting mechanism.

Fig. 2 is a vertical section taken about on the line 2—2 of Fig. 1, certain parts being broken away and further illustrating the cams, and driving mechanism therefor, through the agency of which I prefer to control the shifting of the carriage on which the light-sensitive means is supported when taking the pictures.

Fig. 3 is a vertical section taken about on the line 3—3 of Fig. 2, with certain parts of the motor and other parts of the camera back broken away, as will appear. This view particularly illustrates the detent means that holds the motivating means or motor normally in check.

Fig. 4 is a vertical section taken about on the line 4—4 of Fig. 2, certain parts being broken away, and illustrating means connected with the motor for actuating a signal after the exposing cycle has been completed.

Fig. 5 is a vertical section taken about on the line 5—5 of Fig. 1, and illustrating means controlled by the presence of the plate-holder or film-holder, to inhibit the operation of the shifting mechanism by the operation of the pneumatic bulb unless a plate-holder or film-holder is in position on the carriage at the camera back.

Fig. 5a is a fragmentary view and is a vertical section taken through the pneumatic control device or valve, and showing the upper portion of the tube leading from the pneumatic bulb. This view indicates the relation of the ports through the control device when the holder frame is in position.

Figure 1:
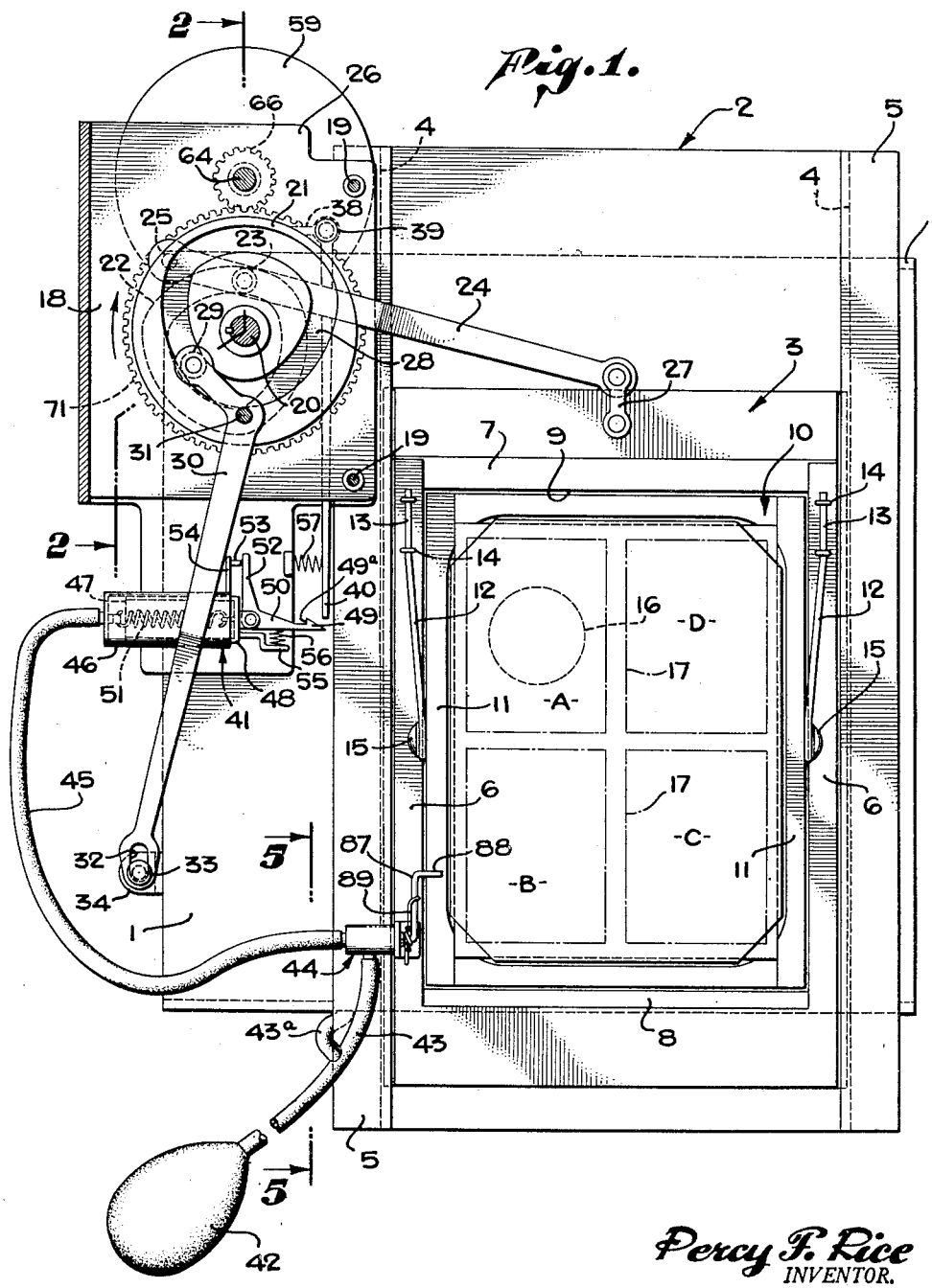

Referring more particularly to the parts, 1 indicates a plate which can operate as the rear wall of the camera, and mounted on this plate to slide horizontally thereon is a slide or vertical slide frame 2 in which a carriage 3 is mounted for vertical movement. The side edges of this carriage may be guided in guide grooves 4 cut in the inner edges of side bars 5 of the vertical guide frame 2.

The carriage 3 is provided with means in which the plate-holder or film-holder can be mounted, and for this purpose it includes two side bars 6 that are fixed to its outer side connected by cross bars 7 and 8, and these bars define a rectangular opening, an edge 9 of which is indicated in Fig. 1. In this opening a movable holder frame 10 is mounted, the side bars 11 of this holder frame being supported on resilient arms 12, the shanks 13 of which are held in staples 14 driven into the rear face of the side bars 6. The ends of these springs are attached by screws or pins 15 to the outer sides of the side bars 11 of the holder frame 10. These spring arms 11 exert their resiliency in a direction to press the holder-frame 10 into the pocket below the edge 9, into which the plate-holder is slid from above. After the plate-holder is in position, the light stop or screen on the forward side of the plate is withdrawn by pulling it upwardly in the usual manner.

In Fig. 1, the outline of the lens 16 of the camera, is indicated in dotted lines.

With the construction described, it will be evident that the carriage 3 carrying the holder-frame 10, can be shifted up and down so as to bring the different exposure areas or frames 17, indicated in dotted lines in Fig. 1, opposite the lens. But of course in order to bring the two frames 17 that are located toward the right, opposite the lens, it is necessary to shift the slide or guide frame 2 longitudinally along the fixed plate 1. The mechanism for accomplishing these shifting movements will now be described. This mechanism is located in a frame or casing 18, which, in Fig. 1, is illustrated at an elevated position, and at the left edge of the frame 2 to which it may be bolted by bolts such as the bolts 19.

Before proceeding to a detailed description of this shifting mechanism, it may facilitate the disclosure to state that I utilize two cams for this purpose, one of which is connected to the carriage 3 through a lever for raising or lowering the carriage, and the other of which operates a lever that is anchored at its outer end to the fixed plate 1.

Referring now to Fig. 2, in connection with Fig. 1, I provide a cam shaft 20 rigidly carrying a cam wheel 21 on one face of which a channel cam 22 is provided, in which a roller 23 rides, said roller being secured to the side of a lifting lever 24, the short arm of which is attached by a pivot pin 25, to one of the frame plates 26 of the casing. The long arm of this lever is offset to bring its outer end nearly into the plane of travel of the carriage 3, and its end is attached to the carriage by a short link 27.

On the outer face of the cam wheel 21 there is a similar channel cam 28 in which a roller 29 rides, said roller being carried at the end of the short arm of a bellcrank lever 30 pivotally mounted on a pin 31 that is secured in the outer one of the frame plates 26. The long arm of this lever 30 has a pin-and-slot connection to the left portion of the camera plate 1, that is to say, the lever has a slot 32 in its end that receives a pin 33 carried in a bracket 34 that is attached to the edge of the plate 1.

Associated with the cam wheel 21, I provide detent means for detaining or restraining motivating means such as a motor, which is capable of rotating the cam wheel to produce the desired movements of the carriage 3. In the present instance, this detent mechanism includes a detent wheel 35 having four notches 36 with abrupt shoulders 37, respectively, at one end. When the cam wheel is at rest, one of these shoulders 37 is stopped by a detent pawl 38 pivotally mounted on a pin 39 secured in the frame or casing. Automatic means is provided for releasing this detent pawl to permit the cam wheel 21 to be rotated by the motive power, but the operation is such that the rotation cannot occur until after an exposure of one of the areas or frames 17, has just been completed. In the present instance, in order to accomplish this, I provide the pawl 38 with an operating arm 40 that is controlled by pneumatic means 41 (see Fig. 1), and the operation of this pneumatic means is controlled by any desired type of hand-operated device. In the present instance, I have illustrated a pneumatic bulb 42 such as is usually employed in cameras for operating a pneumatically actuated shutter, which this camera illustrated, would have. A pneumatic tube 43 extends from this bulb 42 to a control device 44, which will be described more in detail later, and from this control device 44 an extension hose or tube 45 extends up to the pneumatic device 41. This pneumatic device includes a pneumatic cylinder 46, the function of which is to establish connection to the operating arm 40 of the bellcrank lever that carries the detent pawl 38. In the present instance, the pneumatic cylinder 46 carries a tubular pneumatic piston 47, the head 48 of which projects from the inner end of the cylinder 46 and carries a releasing pawl 49 formed as a part of a bellcrank lever 50. A coil spring 51 normally holds the piston 47 in a retracted position in which it is illustrated in Fig. 1, at which time an arm 52 of the bellcrank lever 50, is held up against a stop pin 53 on an arm 54 extending off from the cylinder 46. The piston head 48 also carries a short projecting arm 55 that is offset to provide space to carry a coil spring 56 between it and the back edge of the releasing pawl 49. If a plate-holder is on the back of the camera when the bulb 42 is squeezed, the control device 44 will open up communication between the two hose extensions 43 and 45, and the pressure exerted will force the piston 47 toward the right, carrying with it the releasing pawl 49, which, under the action of its spring 56, will snap over the lower end of the arm 40 of the detent pawl 38 so that the shoulder 49a on this releasing pawl, will engage the right side of the lever 40 as viewed in Fig. 1. However, as long as the bulb 42 is maintained squeezed or compressed, the piston or plunger 47 will be maintained in its extended position. This insures that no movement of the carriage 3 can occur until the exposure time has elapsed. However, as soon as the bulb 42 is released, the spring 51 will retract the piston 47, whereupon the releasing pawl 49 will pull the lever 40 toward the left a sufficient distance to swing the detent pawl 38 out of engagement with any one of the notches 36 that it engages. As the lever or arm 40 moves toward the left, it compresses its spring 57. When the pivot 47 is completely retracted, the stop pin 53 will be struck by the arm 52 of the releasing pawl 49, and this will swing the releasing pawl 49 downwardly through a small angle to release the arm 40, whereupon the spring 57 will extend itself and swing the end of the detent pawl 38 down onto the edge 58 of the detent wheel 35. So, as soon as the next notch arrives at the detent pawl 38, the pawl will engage its shoulder 37 and stop the wheel. This motion of course will be a turn through 90° which will be the proper amount of movement to accomplish one of the shifting movements occasioned by the levers 24 and 30.

In connection with the cams 22 and 28, it should be understood that while one of the cams is operating to shift its corresponding lever that controls the carriage, the roller of the other arm that controls the carriage, will be running on a dwell of its cam. In this way, although the cams are on the same cam shaft, they will cooperate effectively to effect the proper succession of the shifts of the carriage. For example, suppose that the first area to be exposed is the one illustrated as being in line with the lens 16. If this area or "frame" is designated by the letter A, then the next movement of the carriage 3 will be a vertical movement occasioned by the movement of the cam surface 28a into contact with the roller 29. This will bring the exposure or frame B up into alignment with the lens 16. After the frame B has been exposed, then the cam 22 will operate while the other cam is on a dwell, and bring the frame or exposure area C into line with the lens 16. The next movement to complete the cycle, will be another operation of the lever 24, that will lower the carriage 3 so as to bring the frame D into alignment with the lens.

Any suitable motive power may be employed for rotating the cam shaft 20. In the present instance, I have illustrated a spring motor 59 having a central shaft 60 to which the inner end of a spiral spring 61 is secured. The outer end of this spring is secured at 62 to the peripheral wall 63 of this motor, which wall, of course is fixed to the frame or the casing 18. The shaft 60 may be extended at the right as illustrated in Fig. 2, to form a winding shaft 64 carrying a large wind head 65 for winding the same. In order to wind up the spring 61, the rotation of the winding shaft 64 would be clockwise as indicated by the arrow in Fig. 2. This movement will not be prevented by the driving pinion 66 of the motor, because this pinion is loose on the shaft 64. And a one-way drive connection 67 is provided from the shaft 64 to this pinion 66, including a hub on the pinion 66, having ratchet teeth 68 inclining in one direction, and having abrupt shoulders to cooperate with spring pawls 69 that slide over the inclined faces of the teeth when the spring is being wound. These pawls 69 are carried on a collar 70 rigid on the shaft 64, and the driving motion from the motor is imparted through these pawls to the pinion 66; and this pinion meshes with a large gear 71 rigid on the cam shaft 20.

Although a photographer familiar with this camera back would know merely by observing the position of the vertical guide frame 2 and the position of the carriage 3 in it, which one of the frames A to D would be located in line with the lens 16, nevertheless, in order to make this mechanism foolproof, and enable a photographer not familiar with this camera to operate it without running into difficulties related to the position of the carriage when he commences to take a succession of pictures, I prefer to provide means for indicating when the cycle of taking all of the frames or exposures, is completed. And I also provide means for preventing or inhibiting any movements of the carriage 3 if there is no plate-holder present on the carriage. In order to accomplish this, I may provide the cam shaft 20 with an extension 72, illustrated in Figs. 2 and 4, the rear end of which carries a four-lobed cam 73; that is to say, there is a lobe or actuating peak 74 on this cam, corresponding to each of the exposures or frames A to D, inclusive. Every time one of these lobes 74 passes bellcrank lever 75, it operates a driving pawl 76 carried by this lever, to rotate a ratchet wheel 77, which ratchet wheel has six teeth. On the shaft 78 of this ratchet wheel, there is rigidly secured a cam disc 79 having two cam edges 80, and a shoulder or drop face 81 beyond each cam edge 80, with respect to the direction of rotation of this cam disc. It will require three actuations of the bellcrank lever 75, to move the entire length of one of the cam edges 80 under the pin 82 that rides on these cam edges, which pin is on the end of the short arm of a bellcrank lever 83, the long arm of which carries a hammer head 84 that can strike a bell 85. Whenever the pin 82 arrives at one of the shoulders 81, a coil spring 86 attached to the bell crank lever 83, pulls the hammer head over against the bell 85 and rings it. Whenever this bell rings, the photographer knows that the cycle of exposures has been completed. There is, therefore, no danger of his forgetting how many exposures he has made, and possibly starting to remove a plate or film before his cycle of exposures has been completed, or taking two exposures at one "frame."

The control device 44 will now be described. This control device is a two-way valve, the position of which is automatically controlled by the presence of a plate-holder mounted on the carriage 3. This valve is in the form of a cock; the rotary member of which has a laterally extending lever 87 (see Figs. 1 and 5). This lever extends longitudinally along the side edge of the presser frame 18, and has a lateral pintle 88 on its end, that projects across the outer face of the adjacent side bar 11 of the holder frame 10. A spring 89 is provided, that normally holds the pintle 88 against the adjacent face of a side bar 11, and in this position of the lever 87, the valve 44 will close off communication between the hose sections 43 and 45. This, however, will not interfere with opening of the shutter of the camera by the pneumatic bulb 42. In this connection, it should be understood that the pneumatic bulb 42 would be located in its usual position on the camera, and the hose 43 leading from it would have a branch section 43a which would lead to the shutter, while the other branch 43 would connect to the control valve 44.

In Fig. 5, I illustrate the position of the lever 87 in dotted lines at 87a. This would be approximately the position to which this lever would be raised by the face of the side bar 11 when the plate-holder is in position under, or in front of, the presser frame 18. In this position the valve 44 would be open; that is to say, it would open communication from the pneumatic bulb 42 to the hose section 45 that leads to the pneumatic device 46. Hence if a plate-holder is in the camera back, then the squeezing of the bulb 42, will operate the shutter, and will also operate the pneumatic device 46 which will cooperate with the motor to give the shifting movements to the carriage 3, it being understood of course, that the horizontal movements of this carriage, are effected through the agency of the vertical guide frame 2 that slides horizontally on the fixed plate 1.

I shall now recapitulate the mode of operation of this camera back.

Assuming that the plate or light-sensitive means mounted on the carriage 3, is in the position indicated in Fig. 1, with the upper left-hand corner of the light-sensitive means or plate in alignment with the lens 16, when the bulb 42 is squeezed, the branch 43a of the hose that leads to the shutter, will of course operate the shutter to effect an exposure. By reason of the presence of the plate-holder in the camera back, the presser frame 10 will be held in the position indicated in dotted lines in Fig. 5, which will hold the lever 87 of the control device 44 in the position indicated in dotted lines in Fig. 5. This will maintain the control device 44 in an open position, so that the hose 43 will be in communication with the hose section 45. So, when the bulb 42 is squeezed, the air pressure developed back of the piston 47, will project the piston out of the cylinder 46, and this will enable the releasing pawl 49 to connect itself to the end of the arm 40 of the detent pawl 38. The mechanism will then maintain itself in this set position until the squeezed bulb 42 is released. As soon as this occurs, the return spring 51 for the piston 47, will retract the piston 47, and the released pawl 49 will then pull the lower end of the arm 40 toward the left as viewed in Fig. 1. This will lift the detent pawl 38 out of the notch 36 in which it is resting, whereupon a wound-up spring 61 will cause rotation of the motor shaft 60 in an anti-clockwise direction, and this rotation will be imparted through the one-way drive connection 67 to the pinion 66, which will of course rotate the gear wheel 71 on the cam shaft 20. This rotation will continue until the pawl 38 engages the shoulder 37 of the next notch 36. It will be pressed down into the notch through the agency of the spring 57 (see Fig. 1) that urges the lever 40 toward the right. In this way, a rotation of the cam wheel 21 through 90° is occasioned. The first movement of this cam will pull the lever arm 21 upwardly and bring the exposure area B into line with the lens 16. After the next exposure is completed, with the incidental releasing of the squeezed bulb 42, the other cam 22 will exert a force upon the bellcrank lever 30 in a direction to swing the long arm carrying the slot 32 toward the right, but as the plate 1 to which the slot 32 is anchored, is a fixed part, the action of the cam will be to slide the vertical guide frame 2 toward the left. This motion will be sufficient to bring the exposure area C into line with the lens 16. After the next exposure, the cam lever 24, which will then be in an elevated position, will swing downwardly so as to bring the frame or area D into line with the lens 16. When all the exposures including area D have taken place, this will complete the cycle, and the indicating mechanism illustrated in Fig. 4, will ring the bell 85, notifying the photographer that he should remove the exposed plate, or film, to be developed.

It should be understood that in the practice of this invention, the camera illustrated could be mounted so that the slide would be guided to move in a vertical direction instead of a horizontal direction, in which case of course, the carriage would move horizontally instead of vertically, when being shifted. In other words, in using the terms "vertical" and "horizontal" in the specification and claims, it should be understood that these terms are merely relative terms to each other.

Many other embodiments of the invention may be resorted to without departing from the spirit of the invention.

I claim as my invention:

1. In a camera for making a series of exposures on light-sensitive means, and having a lens and a shutter, with means for controlling the shutter: the combination of a fixed part on the camera, a carriage for carrying the holder for the light-sensitive means, a slide mounted to shift substantially horizontally with respect to said fixed part, and having means for guiding said carriage to shift substantially vertically, shifting mechanism mounted on said slide including cam means rotatably supported by said slide, a lever pivotally mounted on the slide, actuated by the cam means, connected to the carriage for raising and lowering the same on the slide, and a second lever pivotally mounted on the slide and having a connection to said fixed part for effecting a substantially horizontal shifting of the slide.

2. A camera having the combination according to claim 1, in which the shifting mechanism includes a cam shaft having a cam corresponding to the carriage, with means actuated by the cam and connected to the carriage for shifting the same on the slide; and having a cam with means actuated thereby and connected to the fixed part for effecting the horizontal shifting movements of the slide, said cams having a common axis of rotation and operating to rotate in unison to effect each shifting movement, each of said cams having a dwell on its operating surface for inhibiting the actuation of its operated part when the other cam is effecting one of said shifting movements.

3. In a camera for making a series of exposures on light-sensitive means, and having a lens and a shutter, with means for controlling the shutter: the combination of a carriage for carrying the holder for the light-sensitive means, a slide mounted to shift substantially horizontally, and having means for guiding said carriage to move substantially vertically, shifting mechanism including a pair of cams having a common axis of rotation with means operated by one of said cams, connected to the carriage, having a roller riding on the face of that cam; the other of said cams having means connected with the slide for shifting the same, including a roller riding on that cam, each of said cams having a dwell cooperating with its own roller when the other cam is functioning to effect the shifting movement corresponding to it.

PERCY F. RICE.

REFERENCES CITED

The following references are of record in the file of this patent:

UNITED STATES PATENTS

| Number | Name | Date |
|---|---|---|
| 1,088,695 | Goldensky | Mar. 3, 1914 |
| 1,221,063 | Lare | Apr. 3, 1917 |
| 1,662,304 | Doogood | Mar. 13, 1928 |
| 2,172,283 | Kirby | Sept. 5, 1939 |